L. M. NELSON.
TIRE FASTENER.
APPLICATION FILED JAN. 26, 1909.
939,619.
Patented Nov. 9, 1909.
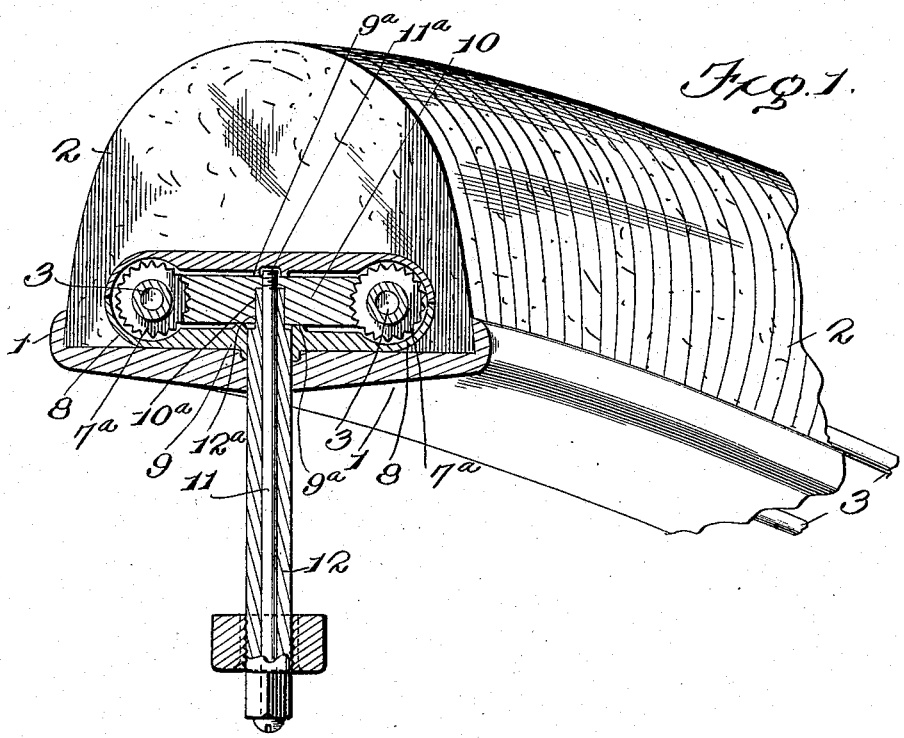
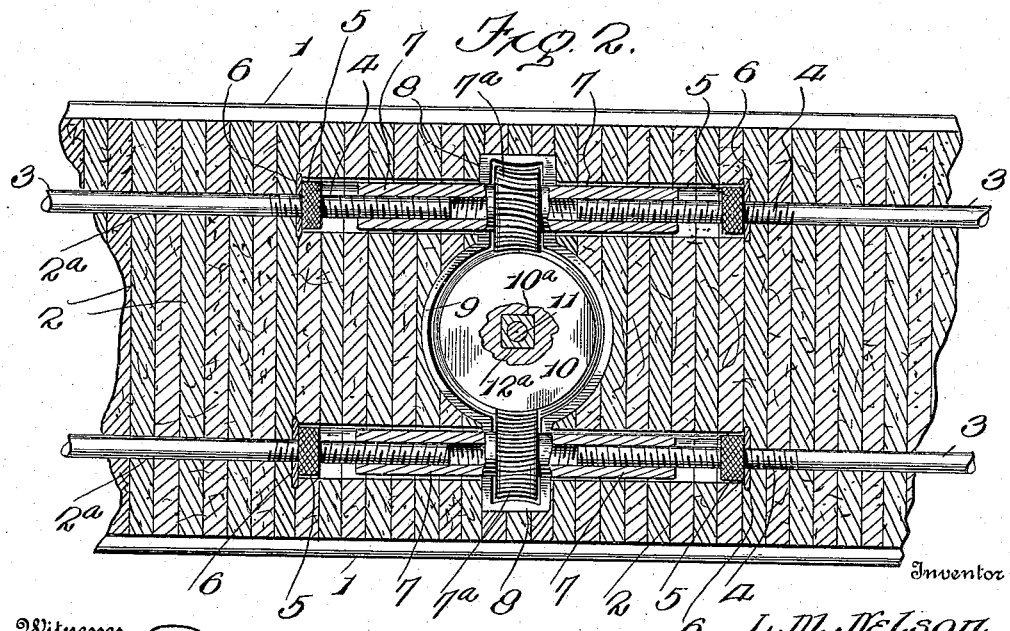

UNITED STATES PATENT OFFICE.

LOUIS M. NELSON, OF DOUGLAS, WYOMING.

TIRE-FASTENER.

939,619.  Specification of Letters Patent.  Patented Nov. 9, 1909.

Application filed January 26, 1909. Serial No. 474,326.

*To all whom it may concern:*

Be it known that I, LOUIS M. NELSON, citizen of the United States, residing at Douglas, in the county of Converse and State of Wyoming, have invented certain new and useful Improvements in Tire-Fasteners, of which the following is a specification.

This invention relates to tires for automobiles or other vehicles, and more particularly to fastenings for securely holding the tire upon the rim of the wheel.

The invention has for its primary object, a simple, durable and efficient construction of tire fastening which is composed of comparatively few parts that may be easily manufactured, and readily assembled, and which will securely hold the tire upon the wheel rim and permit it to be easily slipped thereon, the fastening being especially adapted for resisting sidewise strains that may be imposed upon the tire in service, and providing means whereby the tire may be easily tightened, if the occasion should require, without the need of special tools or the services of a skilled mechanician.

With these and other objects in view, as will more fully appear as the description proceeds, the invention consists in certain constructions, arrangements and combinations of the parts that I shall hereinafter fully describe and claim.

For a full understanding of the invention, reference is to be had to the following description and accompanying drawings in which:

Figure 1 is a perspective view of a portion of a wheel rim and tire which latter embodies the improvements of my invention, the section being taken through the fastening device; and, Fig. 2 is a horizontal sectional view through the fastening device.

Corresponding and like parts are referred to in the following description and indicated in both views of the accompanying drawings by the same reference characters.

Referring to the drawing, the numeral 1 designates a wheel rim which may be of any desired design or construction, and which may be embodied in a wheel of any desired type, and 2 designates a tire which may also be of any desired construction and design, although preferably formed of a number of initially independent sections of fibrous material, molded or vulcanized together to form, in completed condition, an endless ring. The tire 2 is formed with longitudinal bores $2^a$ in which circumferentially extending tie rods 3 are mounted. The tie rods 3 have their ends brought comparatively close together as indicated in Fig. 2, said ends being oppositely threaded as indicated at 4 and projecting in the enlarged portions of the bores $2^a$. Preferably, lock nuts 5 are threaded on the ends 4 of the tie rods, washers 6 being located back of the lock nuts so as to prevent the retraction of the tie rods in the tire while the tie-rods are still disengaged from each other preparatory to tightening up the tire upon the rim of the wheel.

The threaded extremities 4 of the tie rods 3 are received in the oppositely threaded bores of the coupling sleeves 7, said sleeves being preferably integrally formed with preferably concave worms $7^a$, the sleeves extending equal distances in opposite directions from the worms. The worms $7^a$ are received in the laterally extended ends 8 of a casing 9, the main portion of which is substantially cylindrical as illustrated in Fig. 2, the tire being cut out at its base for the introduction of the casing and sleeves. The main or body portion of the casing 9 is intended to accommodate a worm gear 10 which is set between the worms $7^a$ and which meshes with both of them as shown. The worm gear 10 is formed with a preferably square, or other non-circular socket $10^a$ centrally disposed, the outer end of the socket being reduced to receive the threaded outer end $11^a$ of a tie screw 11 which extends through the hollow stem 12. This stem 12 is formed with a reduced outer end $12^a$ which fits within, and which corresponds in shape to the socket $10^a$, the stem being held detachably but rigidly connected to the worm gear 10 by means of the screw 11 in an evident manner.

It is to be understood, that in the preferred process of manufacture, the casing 9 with its coupling sleeves 7, and worms $7^a$ and worm gear 10 are mounted in the tire when the latter is formed, the oppositely threaded bores of the sleeves receiving the screw threaded ends 4 of the tie rods 3. In applying the tire to a rim of a wheel, the stem 12 is detached in order that the tire may be slipped over the rim, and the stem is then applied and held in place by the tie screw $11^a$ and the stem is turned to secure the desired tension. Preferably the inner and outer walls of the casing 9 are formed with bosses 9ᵃ designed to engage the opposite faces of the worm gear 10 to properly space the same from the walls of the casing, and reduce the wear and friction to a minimum.

It is to be particularly noted that the worms 7ᵃ are located close to the rim and close to the side faces of the tire so as to assume a low-down position which will, together with the correspondingly located tie rods, effectually resist any sidewise strain upon the tire.

Having thus described the invention, what is claimed as new is:

1. The combination with a tire formed with longitudinal bores, circumferentially extending tie rods mounted in said bores, the ends of said tie rods being oppositely threaded, of a casing mounted in the tire and formed with a cylindrical body portion and laterally extended ends, worms mounted in the ends of the casing, sleeves rigidly connected to said worms, and protruding in opposite directions from the ends of the casing, said sleeves being formed with oppositely threaded bores engaging the threads of the tie rod extremities, a worm gear mounted in the body portion of the casing and lying between and in the same plane as said bores and meshing with the worms, said worm gear being formed with a non-circular socket, a stem adapted to be slipped into the casing and formed with an outer extremity fitting in said socket, and a tie screw extending through said stem and screwing into the gear whereby to detachably hold the stem in position.

2. The combination with a tire formed with longitudinal bores, and tie rods mounted in said bores, the tie rods being formed with oppositely threaded extremities, of coupling sleeves formed with oppositely threaded bores engaging the threaded extremities of the tie rods, worms secured to said sleeves, a worm gear interposed between and in the same plane with the worms and meshing therewith, the worm gear being formed with a socket, a hollow stem mounted in said socket, and a tie screw extending through said stem and engaging the worm gear to detachably hold the stem in place.

3. The combination with a tire formed with longitudinal bores, and tie rods mounted in said bores, the tie rods being formed with oppositely threaded extremities, of coupling sleeves formed with oppositely threaded bores engaging the threaded extremities of the tie-rods, worms secured to said sleeves, a worm gear interposed between and in the same plane with the worms and meshing therewith, and means for turning said worm gear.

In testimony whereof I affix my signature in presence of two witnesses.

LOUIS M. NELSON. [L. S.]

Witnesses:
W. N. WOODSON,
FREDERICK S. STITT.